(12) United States Patent
McKinley

(10) Patent No.: US 9,524,385 B1
(45) Date of Patent: Dec. 20, 2016

(54) USING AN AUDIO CHANNEL FOR AUTHENTICATING A DEVICE

(71) Applicant: MARVELL INTERNATIONAL LTD., Hamilton (BM)

(72) Inventor: Patrick A. McKinley, Corvallis, OR (US)

(73) Assignee: MARVELL INTERNATIONAL LTD. (BM)

( * ) Notice: Subject to any disclaimer, the term of this patent is extended or adjusted under 35 U.S.C. 154(b) by 21 days.

(21) Appl. No.: 14/565,943

(22) Filed: Dec. 10, 2014

Related U.S. Application Data

(60) Provisional application No. 61/915,226, filed on Dec. 12, 2013.

(51) Int. Cl.
*G06F 7/04* (2006.01)
*G06F 21/44* (2013.01)
*G06F 3/16* (2006.01)
*G06F 21/30* (2013.01)

(52) U.S. Cl.
CPC ............... *G06F 21/44* (2013.01); *G06F 3/16* (2013.01); *G06F 21/305* (2013.01)

(58) Field of Classification Search
CPC .......... G06F 21/44; G06F 21/445; G06F 3/16; G06F 21/305
USPC ..................... 726/2; 713/170, 168
See application file for complete search history.

(56) References Cited

U.S. PATENT DOCUMENTS

| | | | |
|---|---|---|---|
| 7,162,422 B1* | 1/2007 | Bennett | G10L 15/08 704/236 |
| 7,185,197 B2* | 2/2007 | Wrench, Jr. | H04L 9/08 704/270.1 |
| 2007/0047694 A1* | 3/2007 | Bouchard | H04M 3/38 379/67.1 |
| 2009/0167487 A1* | 7/2009 | Shah | G06F 21/35 340/5.2 |
| 2011/0107415 A1* | 5/2011 | Shen | G06F 21/445 726/19 |
| 2012/0242481 A1* | 9/2012 | Gernandt | G06K 19/0705 340/539.13 |

* cited by examiner

*Primary Examiner* — Saleh Najjar
*Assistant Examiner* — Peilang Pan

(57) ABSTRACT

Systems, methods, and other embodiments associated with using an audio link for authentication services are described. According to one embodiment, an apparatus includes The apparatus includes a processor configured to monitor an audio channel for an authentication signal. The authentication signal is an analog signal provided from a host device over the audio channel to the processor when authenticating the apparatus. The apparatus includes an authentication module configured to generate an authentication response after the authentication signal is detected by the processor. The processor is configured to provide the authentication response as an audio signal on the audio channel to a speaker.

20 Claims, 3 Drawing Sheets

USING AN AUDIO CHANNEL FOR AUTHENTICATING A DEVICE

CROSS REFERENCE TO RELATED APPLICATIONS

This patent disclosure claims the benefit of U.S. Provisional Application Ser. No. 61/915,226 filed on Dec. 12, 2013, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Counterfeiting of consumer products is a continuing difficulty for product manufacturers and retailers. For example, counterfeiters may swap counterfeit products for genuine products by buying a genuine product from a retailer and then returning a counterfeit product to the retailer for a refund while keeping the genuine product. Thus, the retailer is left with a counterfeit product and few ways to verify authenticity of the product to prevent this from happening.

Additionally, in certain products with limited capabilities, such schemes may be more common and present greater difficulties because verifying whether a returned product is genuine is very difficult. For example, products such as headphones or other devices that receive input but do not provide communications in return present significant difficulties for verifying authenticity because of the one way communications pathway.

SUMMARY

In general, in one aspect this specification discloses an apparatus. The apparatus includes a processor configured to monitor an audio channel for an authentication signal. The authentication signal is an analog signal provided from a host device over the audio channel to the processor when authenticating the apparatus. The apparatus includes an authentication module configured to generate an authentication response after the authentication signal is detected by the processor. The processor is configured to provide the authentication response as an audio signal on the audio channel to a speaker.

In general, in another aspect, this specification discloses a method. The method includes monitoring, by a processor, an audio channel for an authentication signal. The authentication signal is an analog signal provided from a host device over the audio channel to the processor when authenticating an apparatus associated with the processor. The method includes authenticating, by an authentication module, the apparatus with the host device by generating a response to the authentication signal. The method includes providing, by the processor, the response to a speaker that generates an audio output representing the response for detection by the host device. The speaker receives signals from the audio channel.

In general, in another aspect, this specification discloses a device. The system includes a processor connected to an input audio channel and an output audio channel. The input audio channel is configured to receive input from a host device. The output audio channel is connected to a speaker. The device includes an authentication circuit connected to the processor and configured to cause an audible authentication sound to be generated by the speaker upon receiving an authentication instruction signal from the host device via the processor.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa.

DETAILED DESCRIPTION

Described herein are examples of systems, methods, and other embodiments associated with authenticating a device using an audio data link. In one embodiment, the device is an audio device that is configured to authenticate with a host device. For example, the audio device receives authentication communications from an audio channel and provides an authentication response in the form of an audio signal that is input to a speaker. The speaker then generates sound waves that represent the authentication response, which may be detected by the host device. Because the audio device does not include a two-way electronic communication channel with the host device, such as an Ethernet or other data connection, an alternative for providing communications back to the host device is used.

Accordingly, in one embodiment, the audio device uses an analog audio channel (i.e., audio data link) with the host device to receive communications. The audio channel is, for example, a one-way analog channel through which electric signals are provided to the audio device. However, because the audio channel is one-way, the audio device cannot, for example, use the audio channel to provide communications directly back to the host device.

Thus, in one embodiment, the audio device uses a speaker connected to the audio channel to provide communications to the host device. In this way, a communication loop between the host device and the audio device is complete permitting an authentication exchange between the devices for verifying authenticity of the audio device.

Figure 1:
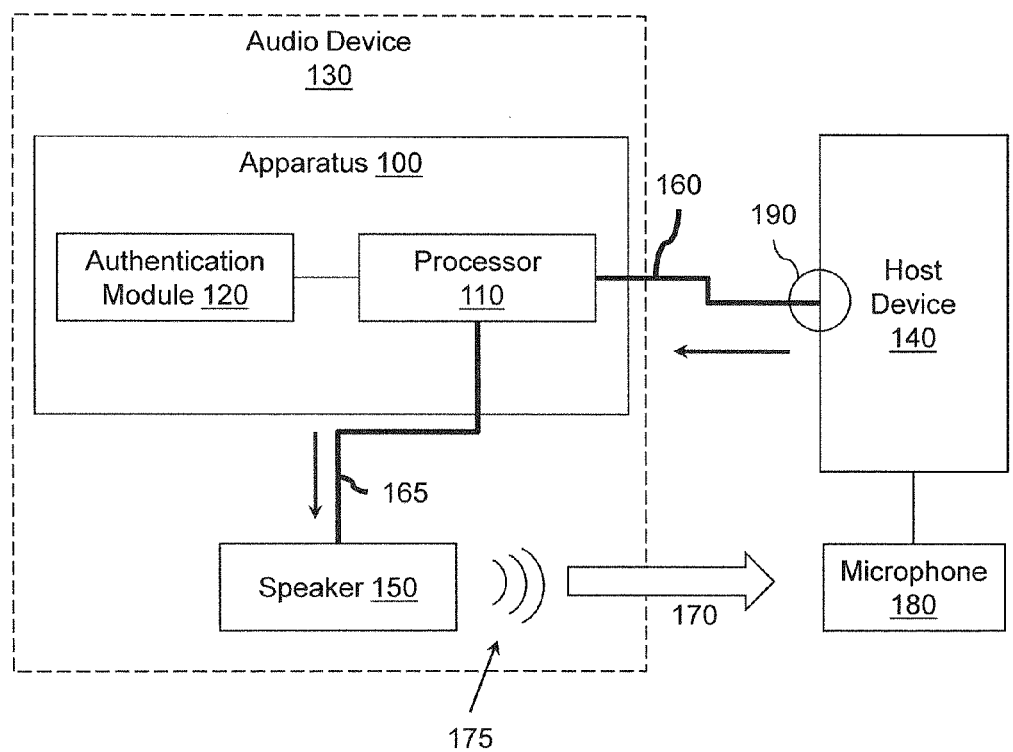
FIG. 1 illustrates one embodiment of an apparatus associated with authenticating an audio device using an audio channel.

With reference to FIG. 1, one embodiment of an apparatus 100 associated with using an audio channel to authenticate a device is illustrated. For example, the apparatus 100 includes a processor 110 and an authentication module 120, which authenticate an audio device 130 that connects to a host device 140.

In general, the apparatus 100 is part of, for example, another device such as the audio device 130. Accordingly, authenticating generally includes proving that the apparatus 100 and by association the audio device 130 is a genuine/authentic product that is not a counterfeit. The audio device 130 may be a pair of headphones, a speaker, a personal entertainment device or more generally any device that is to be authenticated, but has limited pathways for providing authentication information.

The audio device 130 may include a speaker 150 that is connected to the host device 140 via an audio channel 160 and 165. In one embodiment, the audio channel 160 and 165 is an analog channel that carries signals in one direction. That is, the audio channel 160 is a unidirectional communication channel that carries analog electric signals via at least one wire from the host device 140 to the speaker 150. Relative to the processor 110, audio channel 160 is an input audio channel from an input port than can be connected to the host device 140, and audio channel 165 is an output audio channel to the speaker 150.

Accordingly in one embodiment, the audio device 130 has, for example, no physical communication pathway directly back to the host device 140. Thus, exchanging communications for an authentication handshake is complicated because of the lack of a direct communication link back to the host device 140. In one embodiment, the speaker 150 is an output device that receives electric signals as input and generates audio output in the form of sound waves.

Therefore, the apparatus 100 is configured to complete a communication loop with the host device 140 by using the audio channel 165 and the speaker 150 to provide communications that can be detected by the host device 140. In one embodiment, the speaker 150 generates and provides communications from the authentication module 120 over an acoustic channel 170 in the form of sound waves 175 that can be detected by a microphone 180 connected to the host device 140 to complete the loop. In this way, existing functionality of the audio device 130 can be used to facilitate the authentication exchange.

In one embodiment, the host device 140 initiates an authentication exchange with the apparatus 100. The authentication exchange is a sequence of communications that authenticate the apparatus 100 to determine if the apparatus 100 is a genuine device. For example, the host device 140 may be a smartphone with one or more apps (e.g., an authentication app), personal music device, testing fixture or another device that includes an audio link 190 and a microphone (e.g., microphone 180). The audio link 190 is an audio jack, such as a TRS connector jack, a mini jack or other physical audio port to which an audio cable can be connected. The audio cable is a physical cable that includes one or more wires for establishing the audio channel 160.

In one embodiment, the audio channel 160 is a communication channel for carrying analog audio signals that are to be reproduced as sound by the speaker 150. However, when the host device 140 wishes to authenticate the audio device 130, the input audio channel 160 is used as a communication path for the host device 140 to provide an authentication signal to the apparatus 100. For example, the authentication signal is an instruction or request to the apparatus 100 to authenticate itself. As will be described herein, the apparatus 100 responds to the instruction by generating an audio authentication signal that is input on an audio channel to a speaker. The speaker then generates an audible authentication sound. The authentication sound can be heard and used to determine if the audio device 130 is authentic or not. In one embodiment, if no authentication sound is made after an authentication instruction signal is transmitted, the host device 140 can determine that the audio device is not authentic.

With continued reference to FIG. 1, the processor 110 is configured to monitor the audio channel 160 to determine when an authentication signal is being provided by the host device 140. In one embodiment, the processor 110 will pass an analog signal to the speaker 150 when an authentication signal is not present. The processor 110 is, for example, a digital signal processor (DSP) that is configured to detect the presence of an authentication signal. In one embodiment, the processor detects the authentication signal by, for example, monitoring for a command tone or another predefined signal that indicates an authentication signal is present.

The command tone is, for example, a preamble of the authentication signal that triggers the authentication module to provide a following signal to the authentication module 120. The preamble may be a predefined series of tones that may not be common in standard music or speech. In this way, the authentication signal can be distinguished from signals that are otherwise passed to the speaker 150.

Additionally, in one embodiment, the processor 110 is configured to convert the authentication signal from an analog signal into a digital signal for the authentication module 120. That is, when the processor 110 detects the authentication signal, the processor 110 converts the signal to a digital format and diverts the authentication signal to the authentication module 120. When the processor 110 diverts the authentication signal there is no signal provided to the speaker 150. However, in one embodiment, the processor 110 may provide an acknowledgement tone to the speaker 150 to indicate that the authentication signal has been received. The authentication module 120 and the host device 140 may then enter into a data channel mode that permits using the channels 165 and 170 to provide data between the devices.

Once the authentication signal is detected and diverted to the authentication module 120, the authentication module 120 is configured to generate a response to verify an authenticity of the apparatus 100. That is, for example, the authentication module 120 generates a response by decrypting the authentication signal, calculating a response according to the decrypted signal, and encrypting the response for transmission back to the host device 140. In one embodiment, the authentication module 120 generates the response according to a particular authentication function that is used. For example, the authentication module 120 may generate the response according to digital certificates and public-private key encryption, a challenge-response authentication protocol, a CRI CryptoFirewall protocol, a Diffie-Hellman exchange, a secure hash function, and so on.

The host device 140 and the authentication module 120 can authenticate because both are from a trusted source and thus share, for example, a secret key that permits the authentication. If, however, the authentication module 120 or the host device 140 were not from the trusted source, authentication would not be possible. This is because the shared secret would not be available to whichever device was, for example, counterfeit.

In either case, once the authentication response has been generated, the authentication module 120 provides the authentication response to the processor 110. In one embodiment, the processor 110 converts the authentication response to an analog format and provides the converted response on the audio channel 165 to the speaker 150. The speaker 150 transforms the converted response into acoustic sound waves 175 that are carried over the acoustic channel 170 for detection by the microphone 180, which is positioned in the vicinity of the speaker 150. In this manner, the authentication response causes an audible authentication sound to be generated by the speaker 150.

In one embodiment, the acoustic channel 170 is not a direct connection to the host device 190 or an established communication link between the devices. Basically, the speaker 150 generates sound waves that are propagated throughout a nearby area and the microphone 180 is positioned to detect the sound waves as an input signal.

Subsequently, the microphone 180 completes the communication loop between the host device 140 and the apparatus 100 by converting the detected acoustic waves of the authentication sound back into an analog signal that is provided to the host device 140. To verify the authentication, the host device 140 includes an algorithm or circuit configured to compare the signal pattern or properties of the authentication sound to an expected signal pattern. In one embodiment, the response received by the microphone 180 is converted to a digital form and then processed (i.e., decrypted, compared, etc.) according to an authentication protocol being used.

Additionally, in one embodiment, if the authentication sound that is detected by the microphone 180 matches the expected signal pattern to at least a predefined threshold amount, the host device 140 generates a successful authentication result (e.g., illuminating a green light). If the signal match fails, then the host device 140 generates a failed authentication result.

Of course, while a single communication is discussed between the apparatus 100 and the host device 140, in one embodiment, the apparatus 100 and the host device 140 exchange multiple communications as part of an authentication exchange/handshake sequence.

In one embodiment, the authentication exchange between the host device 140 and the authentication module 120 includes one or more communications that are conveyed across multiple communication mediums (e.g., copper electrical channel, air acoustic channel, etc.) in order to complete a communication loop. Furthermore, the communications may be communicated according to one or more protocols including an inter-integrated circuit protocol and so on.

Figure 2:
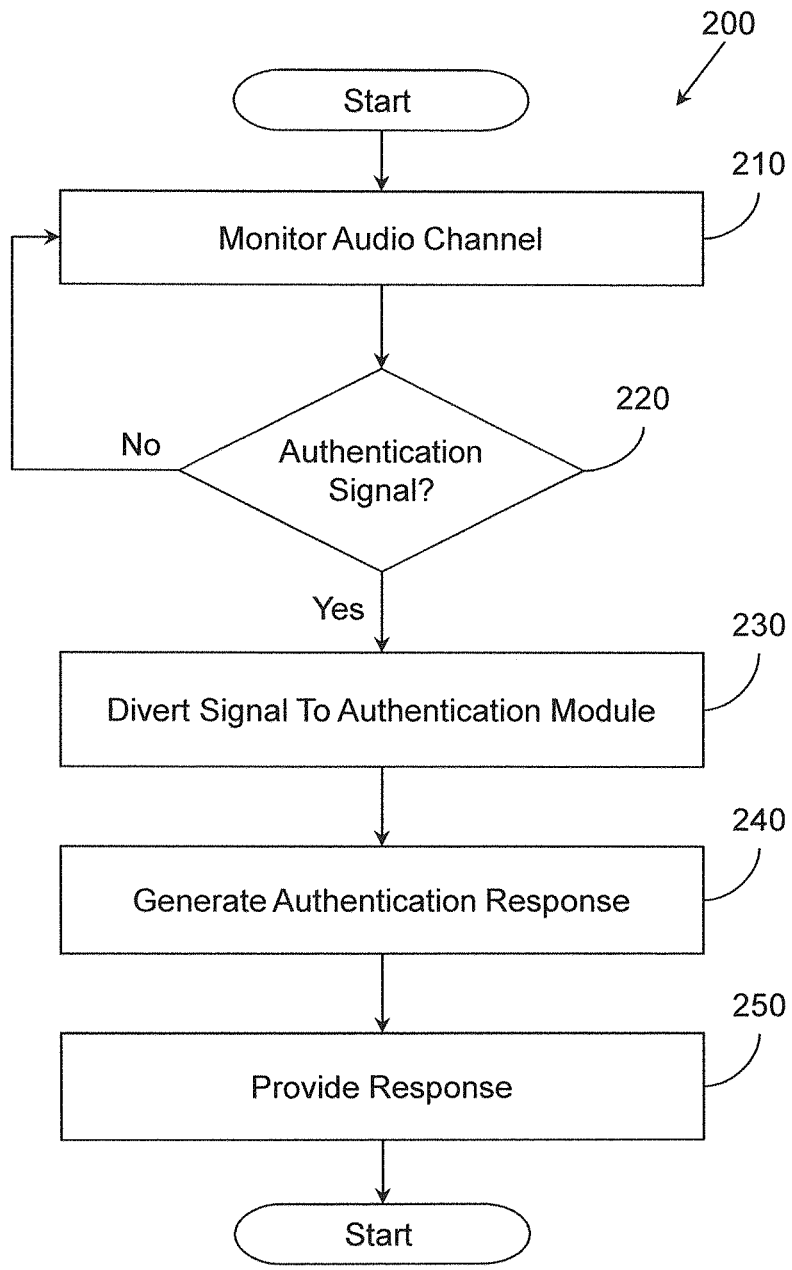
FIG. 2 illustrates one embodiment of a method associated providing authentication communications over an audio channel.

Exchanging authentication communications using an audio channel will be discussed in further detail with reference to FIG. 2. FIG. 2 illustrates one embodiment of a method 200 associated with authenticating a device over a one way channel.

At 210, a one-way channel (e.g., audio channel) is monitored for a command tone or another indication that an authentication signal is present. In one embodiment, the command tone is a predefined portion of an analog signal that identifies a subsequent signal as an authentication signal. A predefined command tone may be stored in the device to use for comparison purposes. As discussed previously, the audio channel is an analog communication channel that carries audio signals. Thus, under standard operations the audio channel carries audio signals to a speaker for reproduction as sound.

Accordingly, the audio channel is monitored and the input audio signals are analyzed to determine and identify if an authentication signal is present. In one embodiment, the authentication signal may be received at any time since there is no predefined schedule or time pattern for providing the authentication signal. At 220, if no authentication signal is detected, then monitoring continues at 210.

However, at 220, if the authentication signal is detected, then, at 230, the signal is diverted from the audio channel. That is, at 230, the authentication signal is diverted from a standard pathway to an authentication pathway that is reserved for authentication signals. In one embodiment, the standard pathway provides received signals to a speaker to produce sound (e.g., music or speech). By contrast, the authentication pathway provides the authentication signal to authentication circuitry for verifying authenticity of a device.

Furthermore, diverting the authentication signal may include converting the signal from an analog signal to a digital signal so that the authentication circuitry can process the authentication signal.

At 240, a response to the authentication signal is generated. While a single authentication signal and response are discussed, in one embodiment, multiple authentication signals may be exchanged as part of an authentication sequence/handshake. Accordingly, generating the response may include calculating or otherwise generating the response according to a challenge embodied in the authentication signal. Generating the response may include generating a secure hash, re-encrypting secure information from the authentication signal, or generally verifying authenticity using a security protocol (e.g., CryptoFirewall).

At 250, the generated response is provided back to a challenging device. In one embodiment, providing the response occurs by communicating the response over a separate medium than a medium over which the authentication signal was received. That is, the response is provided over an acoustic channel via a speaker, over a separate communication band, or, more generally, over a channel that is distinct from the one-way channel (e.g., audio channel) that initially provided the authentication signal. In this way, a communication loop with a challenging device can be completed using capabilities that are already present.

Figure 3:
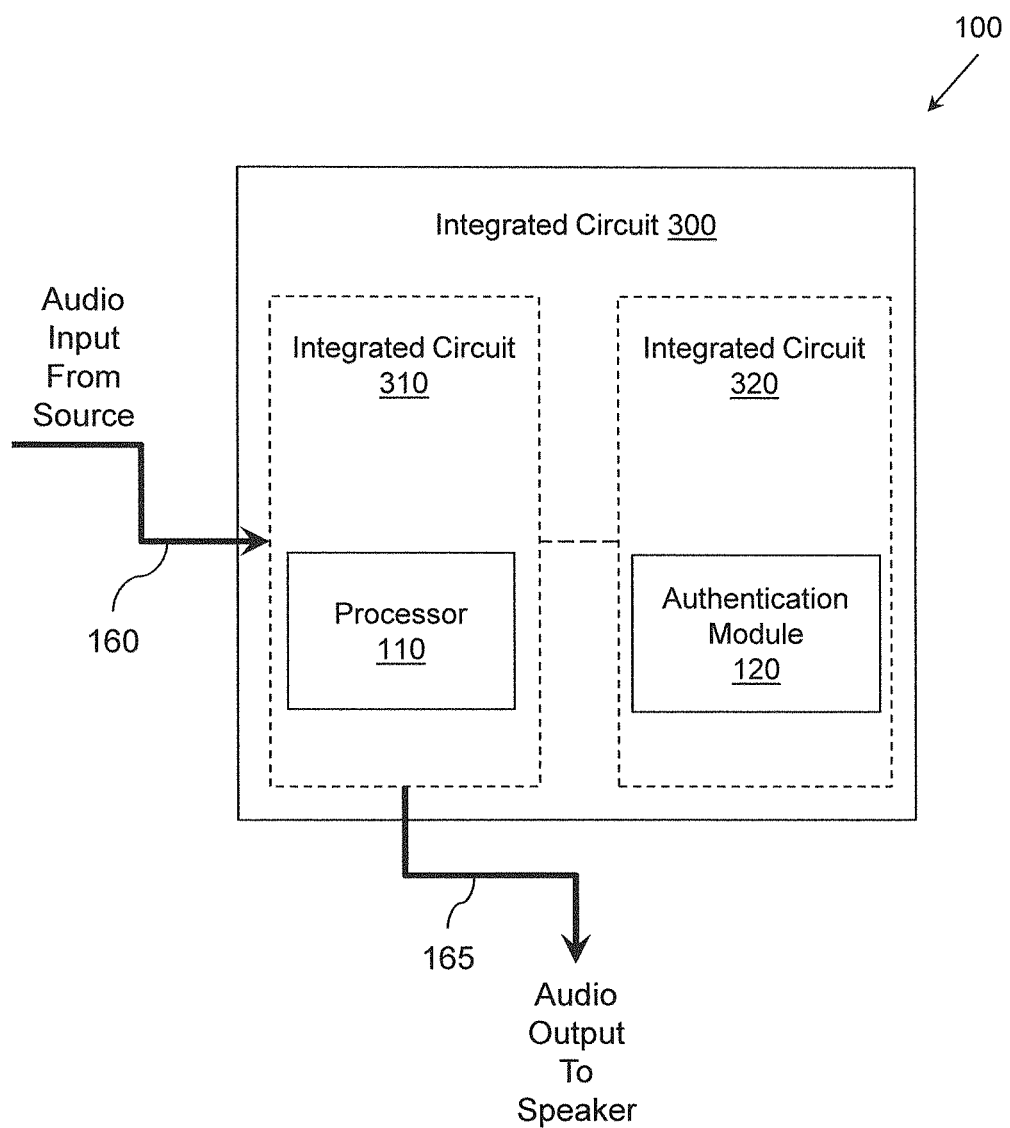
FIG. 3 illustrates one embodiment of an integrated circuit for authenticating with a device over an audio channel.

FIG. 3 illustrates an additional embodiment of the apparatus 100 from FIG. 1 that is configured with separate integrated circuits and/or chips. In this embodiment, the processor 110 from FIG. 1 is embodied as a separate integrated circuit 310 connected along the uni-directional audio channel 160 and 165. Additionally, the authentication module 120 is embodied on an individual integrated circuit 320. The circuits are connected via connection paths to communicate signals. While integrated circuits 310 and 320 are illustrated as separate integrated circuits, they may be integrated into a common circuit board 300. Additionally, integrated circuits 310 320 may be combined into fewer integrated circuits or divided into more integrated circuits than illustrated. Additionally, in another embodiment, the processor 110 and the authentication module 120 illustrated in integrated circuits 310 and 320 may be combined into a separate application specific integrated circuit.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium" as used herein is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a RAM, a ROM, a memory chip or card, a memory stick, and other electronic media that can store computer instructions and/or data. Computer storage media described herein are limited to statutory subject matter under 35 U.S.C §101.

"Logic" as used herein includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C §101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C §101.

To the extent that the term "includes" or "including" is employed in the detailed description or the claims, it is intended to be inclusive in a manner similar to the term "comprising" as that term is interpreted when employed as a transitional word in a claim.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. §101.

What is claimed is:

1. An apparatus, comprising:
    a processor configured to monitor an audio channel for an authentication signal from a host device, wherein the authentication signal is an analog signal received from the host device over the audio channel to the processor when authenticating the apparatus; and
    an authentication module configured to generate an authentication response after the authentication signal is detected by the processor,
    wherein the processor is configured to provide the authentication response as an audio signal on the audio channel to control a speaker to transmit the authentication response as sound waves to the host device
    wherein the processor is configured to, upon detecting the authentication signal on the audio channel, divert the authentication signal from being provided to the speaker via the audio channel to providing the authentication signal to the authentication module, wherein the processor is configured to divert the authentication signal to initiate an authentication process between the apparatus and the host device and to prevent the authentication signal from being provided to the speaker.

2. The apparatus of claim 1,
    wherein the processor is configured to detect the authentication signal by identifying a command tone that is a preamble of the authentication signal, and wherein the command tone is a predefined portion of an analog signal that identifies a subsequent signal as the authentication signal.

3. The apparatus of claim 1, wherein the authentication signal is part of an authentication handshake initiated by the host device, and wherein the authentication module is configured to generate the authentication response as a reply to the authentication signal that verifies an authenticity of the apparatus.

4. The apparatus of claim 1, wherein the processor is configured to convert the authentication signal from an analog signal to a digital signal to provide the authentication signal to the authentication module, and wherein the processor is configured to convert the authentication response from the authentication module into an analog signal for transmission on the audio channel to the speaker.

5. The apparatus of claim 1, wherein the processor is a digital signal processor that is configured to pass an analog audio signal to the speaker when the authentication signal is not present, and wherein the speaker is configured to generate an audible sound that represents the authentication response and that is provided over the acoustic channel to a microphone of the host device.

6. The apparatus of claim 1, wherein the authentication module generates the authentication response according to a cryptographic authentication function, wherein the cryptographic function is compatible with a CRI CryptoFirewall protocol, and wherein the authentication signal and the authentication response are provided according to an inter-integrated circuit protocol.

7. The apparatus of claim 1, wherein the audio channel is an analog audio pathway between the host device and the speaker, and wherein the audio channel is a one-way channel between the host device and the apparatus.

8. A method, comprising:
    monitoring, by a processor, an audio channel for an authentication signal from a host device, wherein the authentication signal is an analog signal received from the host device over the audio channel by the processor when authenticating an apparatus associated with the processor;
    diverting, by the processor upon detecting the authentication signal on the audio channel, the authentication signal from being provided to a speaker via the audio channel to being provided to an authentication module, wherein diverting the authentication signal initiates an authentication process between the authentication module and the host device and prevents the authentication signal from being provided to the speaker;

authenticating, by the authentication module, the apparatus with the host device by generating a response to the authentication signal; and providing, by the processor, the response to a speaker to control the speaker to generate an audio output representing the response as sound waves for detection by the host device, wherein the speaker receives signals from the audio channel.

9. The method of claim 8, further comprising:
wherein detecting the authentication signal includes identifying a command tone that is a preamble of the authentication signal, and wherein the command tone is a predefined portion of an analog signal that identifies a subsequent signal as the authentication signal.

10. The method of claim 8, wherein the authentication signal is part of an authentication handshake initiated by the host device, and wherein the response is generated as a reply in the authentication handshake to verify an authenticity of the apparatus.

11. The method of claim 8, further comprising:
converting, by the processor, the authentication signal from an analog signal to a digital signal to provide the authentication signal to the authentication module, and converting the response into an analog signal for transmission on the audio channel to the speaker.

12. The method of claim 8, wherein monitoring for the authentication signal includes passing an analog audio signal to the speaker when the authentication signal is not present, and wherein the speaker transmits the response over the acoustic channel to a microphone of the host device.

13. The method of claim 8, wherein generating the response includes using a cryptographic authentication function to generate the response, wherein the cryptographic authentication function is compatible with a CRI Crypto-Firewall protocol, and wherein the authentication signal and the response are provided according to an inter-integrated circuit protocol.

14. The method of claim 8, wherein the audio channel is an analog audio pathway between the host device and the speaker, and wherein the audio channel is a one-way channel between the host device and the speaker.

15. An audio device comprising:
a processor connected to an input audio channel and an output audio channel, wherein the input audio channel is configured to receive input from a host device, and wherein the output audio channel is connected to a speaker; and an authentication circuit connected to the processor and configured to control an audible authentication sound to be generated by the speaker as sound waves upon receiving an authentication signal from the processor on the output channel, wherein the processor is configured to, upon detecting the authentication signal on the input audio channel, divert the authentication signal from being provided to the speaker via the output audio channel to providing the authentication signal to the authentication circuit, wherein the processor is configured to divert the authentication signal to initiate an authentication process between the audio device and the host device and to prevent the authentication signal from being provided to the speaker.

16. The device of claim 15, wherein the processor is configured to pass audio signals to the speaker on the output audio channel while monitoring for the authentication signal.

17. The device of claim 15, wherein the processor is configured to provide the authentication signal that includes an authentication response from the authentication circuit to the speaker on the audio output channel to complete a communication loop between the authentication circuit and the host device.

18. The device of claim 15, wherein the processor is configured to monitor the input audio channel for a command tone to determine when the authentication signal is being provided by the host device, and wherein the command tone is a predefined portion of an analog signal that identifies a subsequent signal as the authentication signal.

19. The device of claim 15, wherein the processor is configured to receive signals from the host device over the input audio channel and to provide signals to the host device over the speaker via the output audio channel, and wherein the input audio channel and the output audio channel form a single unidirectional channel between the host device and the speaker.

20. The device of claim 19, wherein the authentication circuit is configured to exchange communications with the host device via the processor, and wherein the communications are authentication communications of an authentication handshake.

* * * * *